April 14, 1936. C. W. RANDALL 2,037,199
BEARING REMOVING AND INSERTING DEVICE
Filed Jan. 7, 1935
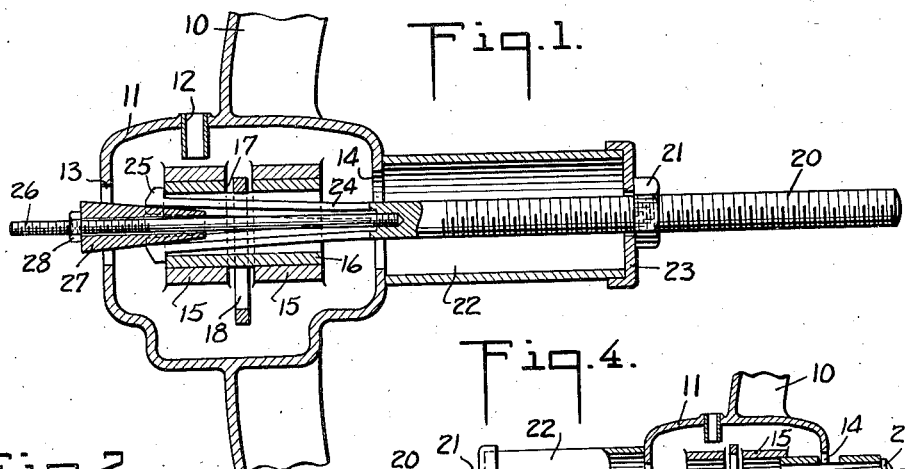
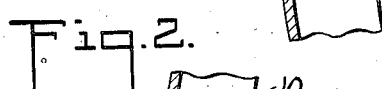
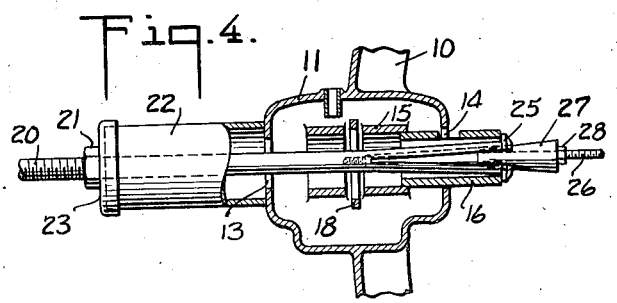
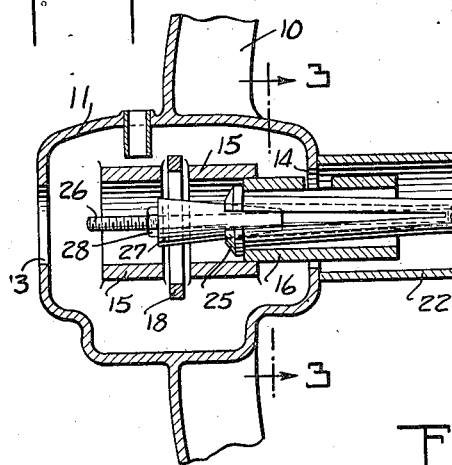
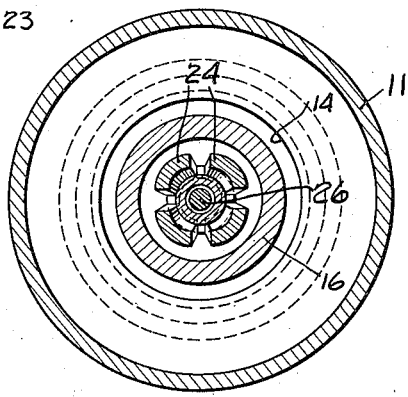
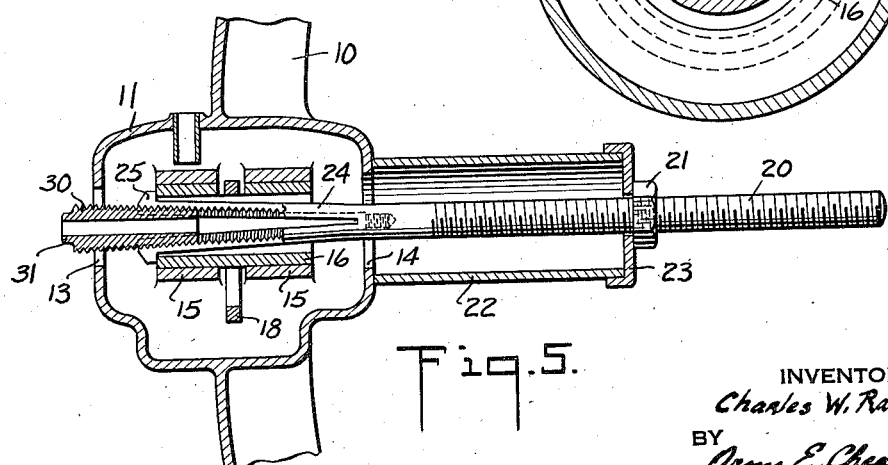
INVENTOR
Charles W. Randall
BY
Orme E. Cheatham
ATTORNEY Patented Apr. 14, 1936

2,037,199

UNITED STATES PATENT OFFICE 2,037,199

BEARING REMOVING AND INSERTING DEVICE

Charles W. Randall, Fort Edward, N. Y., assignor to International Paper Company, New York, N. Y., a corporation of New York Application January 7, 1935, Serial No. 609

1 Claim. (Cl. 29—88.2)

My present invention relates to a bearing remover and inserter and comprises a simple device by means of which any one of a large number of sizes of bearings may be quickly and easily removed or inserted. This device is primarily intended to be used in connection with a certain well known type of motor, but obviously its utility extends to generators, pumps, fans and any type of mechanism wherein bearings are used and which may be encased or otherwise ordinarily inaccessible.

One object of this invention is to make a device of the above defined character which is within the means of every shop, mill, garage or independent mechanic having occasion to pull or insert a bearing, the simplicity of the device making it financially within the reach of everyone. An advantage of my invention lies in the fact that the single device is capable of operating upon bearings of wide differences in size, e. g., a single device which may be used to remove bearings from motors ranging in power from 1 H. P. to 50 H. P.

Other and further objects and advantages of my invention will be apparent from the following description taken in connection with the accompanying drawing wherein like numerals refer to like parts throughout.

Referring to the drawing:

Fig. 1 is a sectional view of my device as it is associated with a well-known type of an encased bearing;

Fig. 2 is a view similar to Fig. 1 showing the bearing almost completely removed;

Fig. 3 is a section taken at right angles to Fig. 2 along line 3—3;

Fig. 4 is a view similar to Fig. 1 but showing the device reversed in operation so as to insert a bearing; and Fig. 5 is a view similar to Fig. 1 showing a slightly modified form of the device.

The type of bearing disclosed illustrates the facility with which my device can be used in connection with an encased bearing or other type of bearing to which access is difficult. There is illustrated a portion 10 of a frame, for instance, the cage or housing of a motor. An integral portion of the frame forms a casing 11 having an oil or grease inserting duct 12 therethrough. At the outer side of the casing 11 there is an opening 13 through which the shaft, e. g., armature shaft, usually extends. At the inner side of the casing 11 is a larger opening 14 of sufficient diameter to allow the bearing to be withdrawn or inserted. Inside of the casing 11 is the bearing support, in this instance consisting of two spaced portions 15 integral with the casing 11. The bearing 16 is of a well-known sleeve type having a notch 17 therein with which cooperates a locking ring 18 located between the sections of the bearing support. It will be apparent from the foregoing that such a bearing is ordinarily inaccessible and heretofore could not be removed without special equipment of a costly nature.

My device comprises a threaded rod 20, the threads of which extend for a substantial distance along the rod from one end thereof. A nut 21 is carried by the rod, and between the nut and the casing 11 there is interposed a sleeve or adapter 22 preferably of sufficient size to accommodate all ordinary sizes of bearings 16 therein. The adapter is formed with an end flange 23 having an opening therethrough large enough to accommodate the rod 20 but small enough so that the nut 21 will be engaged thereby. The flange 23 may be integral with the sleeve, or may be affixed thereto, or may consist of a separate member embracing a separate sleeve. I prefer to make the adapter 22 an integral structure in order that parts of the device may not be lost. Different lengths or diameters of adapter may be substituted by removing nut 21 from rod 20.

The opposite end of the rod 20 is formed with a central bore and slit into preferably four sections 24. The material of the rod is such that these sections may be tempered to allow them to be spread to any desired extent and yet return to their normal position. The ends of sections 24 are formed with flanges as at 25 of sufficient width to engage the end of the bearing 16 without extending over the end of the bearing support 15, there thus being formed an expandible flange on rod 20.

The form of device illustrated in Figs. 1 to 4 inclusive comprises a smaller rod 26, of a diameter less than that of the bore through rod 20, threaded into the rod 20 axially thereof so as to extend outward from between the sections 24. The outer end of rod 26 is threaded and a wedge 27 is loosely mounted thereon with its apex inserted between the rod and the sections 24, and which can be forced inwardly by a nut 28.

In using this form of device as a bearing remover (Figs. 1, 2 and 3) the nut 28 is loosened to such an extent that the sections 24 are not spread, or if spread are not spread to such an extent that the enlarged ends or flanges 25 cannot be inserted through the bearing 16. The nut 21 is withdrawn to such an extent that the rod may be inserted through opening 14 and through the bearing 16 until the flanges 25 are beyond the opposite end of bearing 16. Nut 28 will now protrude through the opening 13, or at least will be easily accessible, and may be tightened to cause the sections 24 to spread and flanges 25 to engage the end of the bearing. Nut 21 is now tightened, the adapter 22 interposed between the nut 21 and the casing 11 causing relative movement of rod 20 and the frame 10 whereby the bearing is pulled outwardly through opening 14 and into the adapter 22 as in Fig. 2.

In using this device as a bearing inserter, the procedure is reversed as in Fig. 4. In this, the adapter 22 surrounds the opening 13. Rod 20 is extended through opening 14 to such an extent that the bearing may be placed thereover and then the wedge 27 caused to expand the members 24 to grip the bearing. Upon tightening nut 21 the bearing will be drawn through the bearing support to the desired extent.

In Fig. 5 I have illustrated a modified form embodying the same principles wherein the inner surfaces of the sections 24 are threaded and a threaded conical wedge 30 is substituted for the rod 26 and smooth wedge 27. The end of wedge 30 is preferably formed with an integral square or hexagonal end by means of which the wedge may be screwed into the rod 20 to spread the sections 24. Obviously, this form of device may be used in the same fashion that the first described form is used. Its advantage lies in its greater strength and the lesser number of parts. However, I prefer to form a threaded extension of the bore between members 24 so that rod 26, smooth wedge 27 and nut 28 may be used with this form of rod 20, if desired. The threads on the inner surface of the sections 24 will not interfere with the action of the smooth wedge.

Other sizes of wedges 27 or 30 may be supplied whereby varying sizes of bearings may be gripped with the least amount of tightening thereof, the limit of adaptability of a single rod being determined solely by the elasticity of sections 24.

I have herein described the preferred form of my invention and a modification of one element thereof. Other modifications and alterations will be readily apparent to those skilled in the art and I do not intend to be limited except by the scope of the following claim which is to be broadly construed.

I claim:

A bearing removing and inserting device comprising a rod having an axial bore at one end and being longitudinally divided into a plurality of resilient sections, an external flange at the end of each section, means to expand the flanged ends of said sections comprising a second rod mounted axially of said bore and fixed longitudinally with respect to said first rod and a concentrically tapering wedge loosely carried by said second rod, said second rod being threaded and carrying a nut to cause relative movement of said wedge and sections upon rotation thereof whereby to expand said flanged ends, a second nut threaded upon the opposite end of said first rod, and a flanged sleeve loosely carried by said first rod between said second nut and said sections, said sleeve having its flanged end disposed toward said second nut and being of sufficient internal diameter to receive said sections when expanded.

CHARLES W. RANDALL.